United States Patent [19]

Luzynski

[11] 4,323,878
[45] Apr. 6, 1982

[54] SECURITY DEVICE FOR MOTOR VEHICLES AND OTHER D.C. ELECTRICAL SYSTEMS

[76] Inventor: Anthony J. Luzynski, 3526 Sheffield Ave., Philadelphia, Pa. 19136

[21] Appl. No.: 189,106

[22] Filed: Sep. 22, 1980

[51] Int. Cl.³ .................... B60R 25/10; G08B 13/22
[52] U.S. Cl. .................. 340/63; 307/10 AT; 180/287
[58] Field of Search ............... 340/63, 64, 65; 307/10 AT; 180/287

[56] References Cited

U.S. PATENT DOCUMENTS

| | | | |
|---|---|---|---|
| 3,533,064 | 5/1967 | Perelman | 340/63 |
| 3,614,734 | 10/1971 | Davis | 340/63 |
| 3,706,966 | 12/1972 | So et al. | 340/63 |
| 3,831,141 | 8/1974 | Bowman | 340/63 |
| 4,038,635 | 7/1977 | Schotz | 340/63 |

*Primary Examiner*—Alvin H. Waring
*Attorney, Agent, or Firm*—Robert K. Youtie

[57] ABSTRACT

A security device for motor vehicles and other d.c. electrical systems responsive to use of the system wherein an alarm or other security element is connected across the source, a relay has its switch connected to the alarm element and its coil connected to a switch maintained open in the stand-by condition responsive to maintained voltage of the d.c. source or battery, the switch closing responsive to lowered d.c. voltage to energize the relay coil and close the relay switch to actuate the alarm element, and delay means controlling the time required by the relay coil switch to assume its open stand-by condition.

7 Claims, 2 Drawing Figures

U.S. Patent    Apr. 6, 1982    4,323,878

SECURITY DEVICE FOR MOTOR VEHICLES AND OTHER D.C. ELECTRICAL SYSTEMS

BACKGROUND OF THE INVENTION

As is well known, vehicle theft and vandalism constitute an immense problem, which has been attacked by the proposal of alarm devices responsive to tampering. A relatively simple installation of theft prevention device is that of measuring battery voltage and actuating an alarm upon voltage reduction, such as would be occasioned by operation of a door light or trunk light. However, prior theft prevention devices operative responsive to battery voltage reduction have not been entirely satisfactory, requiring complex and expensive circuitry, difficult and time consuming installation, and presenting certain operating problems, as in the disarming and arming procedures.

SUMMARY OF THE INVENTION

Accordingly, it is an important object of the present invention to provide a theft prevention device of the type described which is greatly simplified in circuitry, for improvement in economy and reliability, is extremely easy to install, and which is substantially foolproof in operation both in arming and disarming the system.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
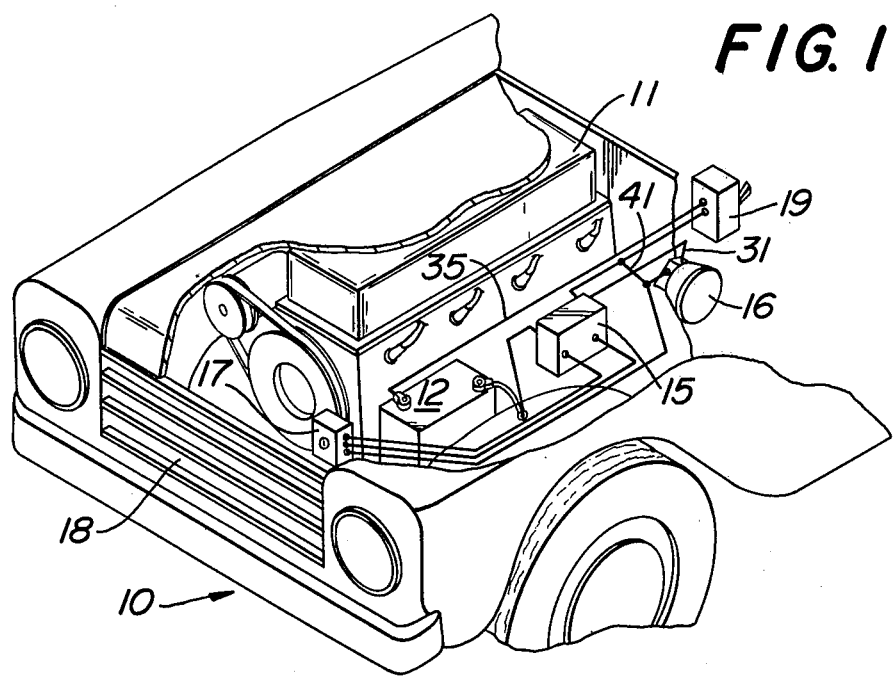
FIG. 1 is a partial perspective view showing a motor vehicle having installed therein a theft prevention device in accordance with the teachings of the present invention.

Referring now more particularly to the drawings, and specifically to FIG. 1 thereof, a motor vehicle is there generally designated 10, and includes an engine 11 and battery or d.c. source 12.

Also mounted in the engine compartment are shown a housing or enclosure 15, containing the electrical circuitry of the instant security device. An alarm element 16, such as a siren or other alarm may be mounted in the engine compartment, as may a disabling switch 17, suitably located in an unobvious position, say behind the automobile grill 18. In addition, an arming switch 19 is shown, and may be at any convenient, but secret location, say on the passenger compartment side of the fire wall.

Figure 2:
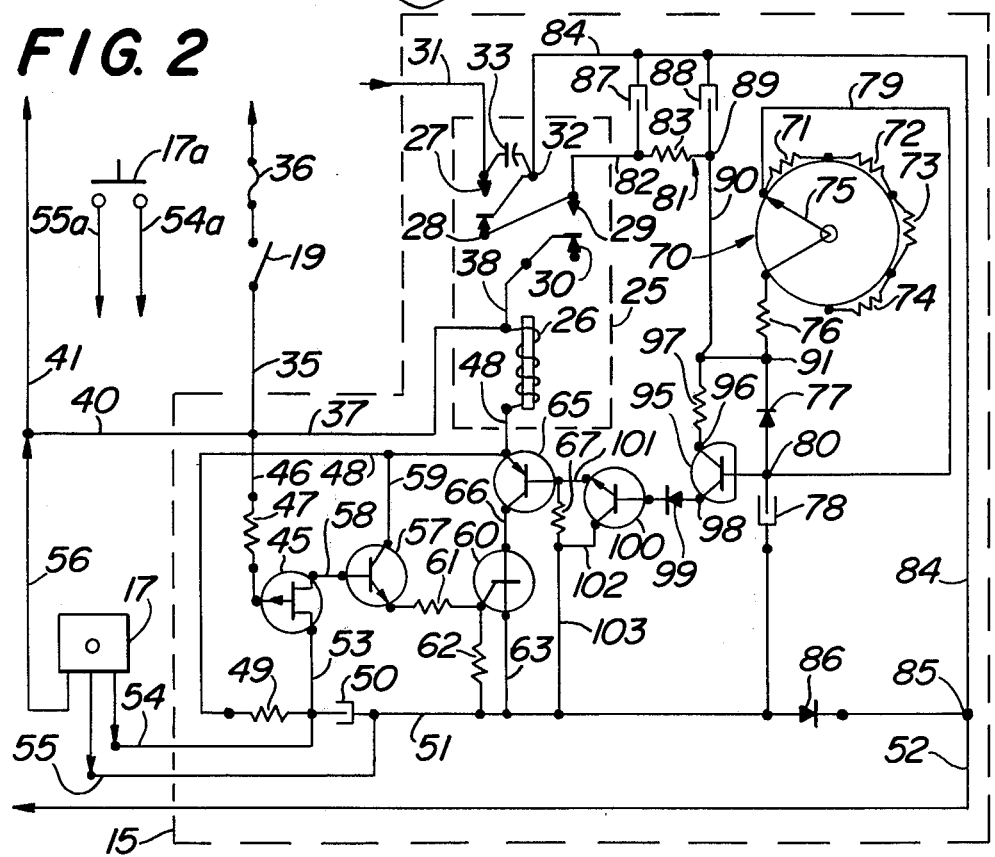
FIG. 2 is a schematic representation of the circuitry of the instant security device.

Referring now more particularly to FIG. 2, where the enclosure or housing 15 is represented by a dash line, the manual switch 19 and disabling switch 17 are shown outside of the housing 15.

Within the housing 15 there is shown a relay 25, including a relay coil 26 and a pair of normally open relay switches 27, 28 and 29, 30. The switch contact 27 is connected by a conductor 31 to one side of the alarm element or siren 16. Of course, the alarm element may be visual as well as audible. The relay 25 includes an additional contact 32, which is closed to the switch 27, 28, when the latter switch is closed. A condenser 33 is connected between the contacts 27 and 32.

A supply conductor 35 extends from one side of the d.c. source or battery, the positive side, and may include a suitable fuse 36, and the manual arming switch 19, from which it extends into the housing 15. Within the housing 15, from the conductor 35, there extends a further conductor 37 to one end of relay coil 26, which is connected by a conductor 38 to the contact 30 of switch 29, 30. The conductor 35 may be further connected by a conductor 40 and a conductor 41 to the other side of the alarm element or siren 16. Thus it will be appreciated that the siren 16 is connected between the conductors 41 and 31.

Within the housing 15, there is provided a P channel transistor 45 having its gate electrode connected by a conductor 46 through a resistor 47 to the positive supply line 35. The relay coil 26 is connected, remote from the conductor 37, by a conductor 48 to resistance 49 and one side of a capacitance 50. The other side of the capacitance 50 is connected by a conductor 51 and an additional conductor 52 to the battery ground or chassis. The resistor 49 and capacitor 50 define an r-c delay circuit, as will appear fully hereinafter, and a conductor 53 is connected from and between the resistor 49 and capacitor 50, and is connected to the source electrode of transistor 45.

The disarming switch 17 may be a magnetically sensitive switch, say of the Hall effect type, and may be connected by conductors 54 and 55 to opposite sides of capacitor 50, for discharging the latter upon closure of the switch 17. The Hall effect switch 17 may include an additional conductor 56 connected to the positive supply conductor 40. If desired, the magnetic switch 17 may be replaced by a simple push button switch, as at 17a connected to the conductors 54a and 55a.

An NPN transistor is designated 57, having its base connected by conductor 58 to the drain of transistor 45, and having its collector connected by conductor 59 to conductor 48, which is connected through relay coil 26 to the supply line 35. A silicon controlled rectifier 60 has its gate connected through a loading resistor 61 to the emitter of transistor 57. A bias resistor 62 is connected between the gate of silicon controlled rectifier 60 and the ground conductor 51. The cathode of rectifier 60 is connected by conductor 63 directly to conductor 51.

A PNP transistor 65 has its cathode connected by conductor 66 to the anode of rectifier 60, and has its emitter connected to the conductor 48. A bias resistor 67 is connected between the base of transistor 65 and conductor 51.

A selector switch is generally designated 70 and includes a plurality of series connected resistors 71, 72, 73, and 74, and a rotary contact or arm 75. The arm 75 is connected through a resistor 76, diode 77 and capacitor 78 to conductor 51. The series connected resistors 71–74 are connected by conductor 79 from resistor 71 to a junction 80 between the diode 77 and capacitor 78. Thus, a circuit through resistor 76, arm 75, selected resistors 71–74, conductor 79 and capacitor 78 defines a r-c circuit having a desired time constant for a purpose appearing presently.

The contact 29 of relay switch 29, 30 is connected through a filtering circuit 81 including a conductor 82 extending from contact 29 to a resistor 83. A conductor 84 extends from contact 32 to contact 51 at a juncture 85 between diode 86 and ground wire 52. Connected between the conductor 84 and the conductor 82, on one side of the resistor 83 is a filtering capacitance 87; and, an additional filtering capacitor 88 is connected between the conductor 84 and the conductor 82 on the other side of resistor 83, at a juncture 89. The filter circuit 81 is connected by a conductor 90 from the juncture 89 to a juncture 91 between the diode 77 and r-c resistor 76.

A unijunction transistor 95 has its emitter connected to junction 80, one base electrode 96 connected through a loading resistor 97 to conductor 90, and has its other base electrode 98 connected through a diode 99 to the base electrode of an NPN type transistor 100. The emitter of transistor 100 is connected by a conductor 101 to the base of transistor 65, and the collector of transistor 100 is connected by conductor 102 to conductor 103 between resistor 76 and conductor 51.

OPERATION

In order to arm the alarm device of the present invention to a stand-by condition the switch 19 is manually closed to place battery positive voltage, with no current flow, on the gate of transistor 45. This gate may be considered as the control electrode for initiating alarm operation, as will presently become apparent. The positive voltage on the gate of transistor 45 greatly increases the resistance through the current path between the source and drain of transistor 45, so that little or no current flows through the latter transistor.

Positive battery voltage is also applied to the relay coil 26, which passes a relatively small current, as limited by resistor 49 to the slowly charged capacitor 50, say in ten seconds, or so. This serves as a delay to arming the circuit and permits an operator to open a vehicle door and leave the vehicle without actuating the alarm element. The current passing through relay coil 26 is not sufficient to energize the coil, but only slowly charge the capacitor 50, which has its negative side connected to ground. The positive voltage to the gate or control electrode of transistor 45 makes the resistance of the current path between source and drain of transistors 45 very high, so that only a small amount of current will flow through the current path to the base emitter of transistor 57, loading resistor 61 and biasing resistor 62 to the gate of transistor 60. This very small current flow in the gate of rectifier 60 is insufficient to trigger the current path between anode and cathode, so that the relay coil 26 is not energized and the switches 27, 28 and 29, 30 remain open.

The PNP type transistor 65 has its base connected to bias resistor 67 which is sufficiently high to decrease the internal resistance of transistor 65 between its emitter and collector. This results in a higher voltage being applied to the anode of rectifier 60, say approximately 11 volts.

Upon reduction in battery or source voltage, say by opening of a door or trunk to actuate a door or trunk lamp, the control electrode or gate of transistor 45 is less positively charged and decreases the resistance of the current path between the source and drain of transistor 45, to instantly allow more current flow through the path. This flow is supplemented by the discharge of delay capacitor 50 through the current path of transistor 45. Increased base current in transistors 57 allows more current to flow through collector to emitter of transistor 57, and loading resistor 61 to overcome the bias of resistor 62 at the gate of rectifier 60. The rectifier 60 triggers or locks in to provide a low resistance path between anode and cathode for increased current through relay coil 26 to energize the latter and close the relay switches 27, 28, and 29, 30. Closure of switch 27, 28 actuates the alarm element, siren or other. In this actuated or alarm condition the common potential at the emitter of transistor 65, collector of transistor 57 and source of transistor 45 drops to a very low value, approximately 1.5 volts, so that these transistors lose control over the gate of rectifier 60.

Thus, it will be appreciated that in the stand-by condition the transistors 60 and 65 may be considered as open switching means maintaining the relay 25 de-energized, and the transistors 45, 57 may be considered as switch operating means operative to close the open switching means upon lowering of battery voltage. Once the switching means 60, 65 is closed or conducting, the operating means 45, 47 has lost control.

In the actuated or alarm condition, the relay switch 29, 30 is closed to apply battery voltage to the filtering circuit 81, which voltage is then applied to loading resistor 97, unijunction bases 96 and 98, through diode 99 to the base of transistor 100. The filtered battery voltage is also applied through the time constant resistors 76 and 71-74 to the capacitor 78, which has its negative side connected to ground.

When capacitor 78 reaches a full charge, as determined by the selected time constant resistors 71-74, the capacitor discharges through the emitter of unijunction 95 to its base 98, through diode 99 and applies a positive potential to the base of transistor 100. This higher positive voltage on the base of transistor 100 triggers the latter into conduction and causes base to emitter and collector to emitter current flow which raises the positive charge on the base of transistor 65. This high positive charge on the base transistor 65 momentarily cancels the current flow in transistor 65 from emitter to base and emitter to collector, so that there is insufficient current through conductor 66 between the collector of transistor 65 and anode of rectifier 60 to maintain the coil 26 energized. The relay 25 therefore drops out and opens the switches 27, 28 and 29, 30 to discontinue actuation of the alarm element. The shunting capacitor 33 will absorb current flowing in the alarm upon opening of the relay switch 29, 30.

From the foregoing it will be appreciated that the present invention provides a security device particularly well suited for motor vehicles having a battery, and also suited for other battery operated or direct current systems, which device is extremely simple in design and reliable in operation, while permitting of substantially foolproof arming and disarming, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A security device for use with a d.c. electrical system including a d.c. source, said device comprising an alarm element connected across said source, relay means including a relay coil and a normally open relay switch, said relay switch being connected to said alarm element to actuate the latter on energization of said relay coil, switch means connected to said relay coil to maintain the latter de-energized in the stand-by condition and energized in the alarm condition, operating means connected to said d.c. source and said switch means to maintain the latter open responsive to constant voltage of said source and effect closing of said switch means responsive to lowered voltage of said source, and delay means controlling the time required by said operating means to assume its open switch means maintaining condition, said relay including an additional relay switch adapted to close and open with said first mentioned relay switch, and timer means connected to said additional relay switch and said switch means for opening the latter and de-energizing the relay coil after a predetermined interval to open said first mentioned and additional relay switches and stop actuation of said alarm element.

2. A security device according to claim 1, said switch means comprising a rectifier, and said operating means being connected to said source and rectifier to bias the latter to an untriggered condition under constant source voltage and to a triggered condition upon lowered source voltage.

3. A security device according to claim 2, said operating means comprising semiconductor means including a control electrode connected to said source and a current path having a resistance varying with the control electrode voltage and connected to said switch means for triggering the latter upon reduced source control voltage imparted to said control electrode.

4. A security device according to claim 3, said delay means including an r-c circuit connected to said current path and building a sufficient voltage to effect said triggering only after a predetermined period.

5. A security device according to claim 4, in combination with a temporary disabling switch connected to said delay means r-c circuit to discharge the latter and permit disarming of the device without actuating the security element.

6. A security device according to claim 4, said r-c circuit delay means including said relay coil and sufficient resistance to draw insufficient current to energize said relay coil.

7. A security device according to claim 1, said timer means including an r-c circuit connected to said additional relay switch, and triggerable conduction means connected to said r-c circuit and switch means to be triggered by a voltage buildup in said r-c circuit corresponding to a predetermined period of time for biasing said switch means to open to de-energize said relay coil and open relay switches.

* * * * *